J. C. GRAY.
Bee Hive.
No. 31,454. Patented Feb. 19, 1861.
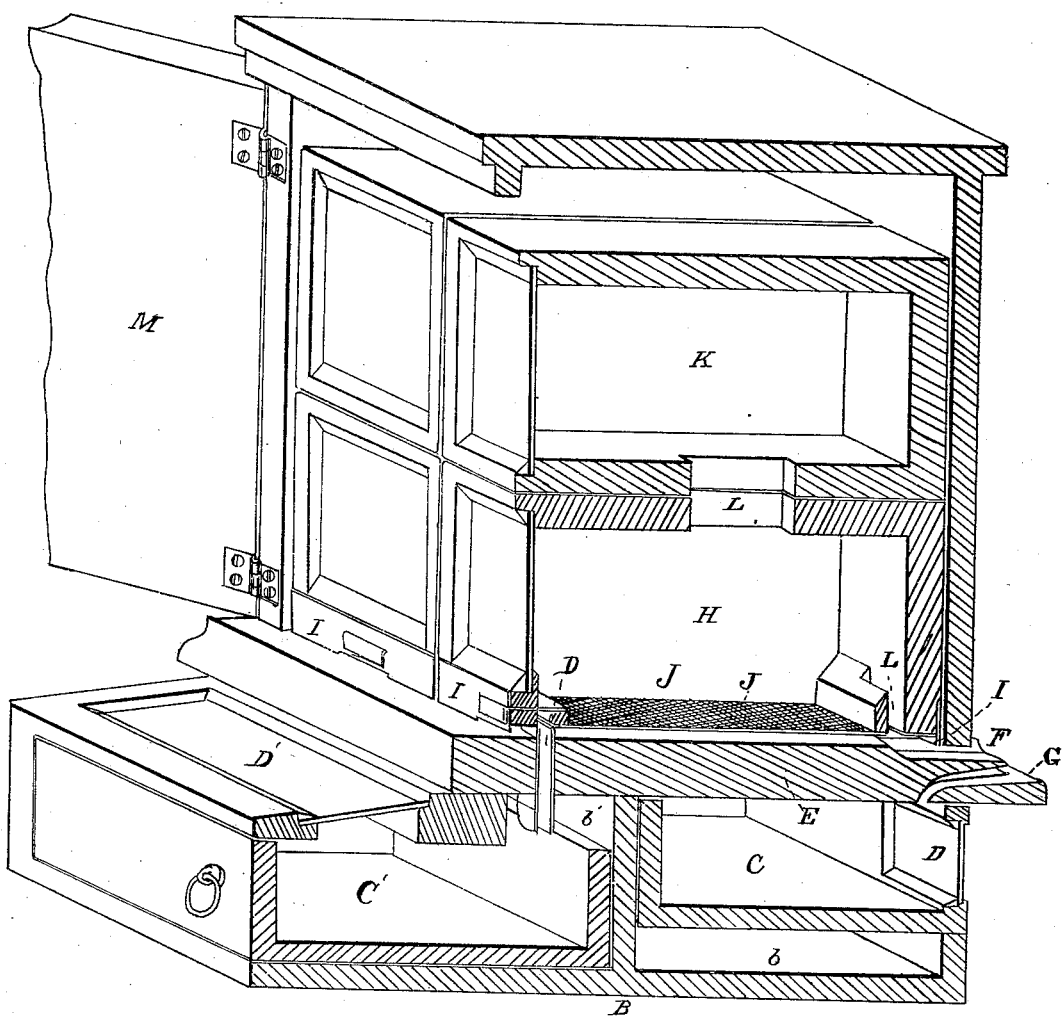
Witnesses:
Octavius Knight
J. M. Gordon
Inventor:
J. C. Gray
By Knight Brothers Attys

UNITED STATES PATENT OFFICE.

JOSIAH C. GRAY, OF FRANKFORT, INDIANA.

BEEHIVE.

Specification of Letters Patent No. 31,454, dated February 19, 1861.

*To all whom it may concern:*

Be it known that I, JOSIAH C. GRAY, of Frankfort, Clinton county, Indiana, have invented a new and useful Improvement in Beehives, of which the following is a full, clear, and exact description thereof, reference being had to the annexed drawings, making part of this specification.

This invention consists of an arrangement of several devices, which as here combined are believed to afford an effectual bar to the inroads of the miller or bee moth.

The main body or bee chamber A rests upon and is attached to a pedestal B, which contains two compartments b, b', adapted to receive drawers C C' of which the drawer C, is intended to receive such millers as enter the hive by false aperture hereafter described and is lighted by a glass pane D, while the drawer C' is for bee food, and is lighted by glass pane D'.

The floor E of the bee chamber is composed of marble or other mineral substance. The front edge of the floor E is perforated by two apertures or sets of apertures F, G, one set F being the bee entrance proper and leading upward into the bee chambers, and the other set G, of smaller dimensions, leading downward into the miller drawer C.

The breeding boxes H are shod with metallic rims or flanges I by which they rest flush upon the mineral floor E. The rims I being of metal and snugly touching all around, the cold and level surface of the mineral floor E effectually bars the entrance of the miller into the boxes save through the bee entrance.

The floor of the breeding box consists of wire gauze J and is elevated sufficiently from the mineral floor E to be out of reach of the miller as that insect cannot or will not use its wings in such confined spaces, nor will it touch with its feet the cold metallic rims of the breeding boxes.

K are honey boxes.

Apertures L closable by slides, afford communication at will from the breeding boxes to the honey boxes, feeding drawer and floor respectively.

M is a door which affords access to the bee chamber.

I claim as new and of my invention and desire to secure by Letters Patent—

The described arrangement of bee chamber A, pedestal B, moth trap C, mineral floor E having the described upward and downward apertures F, G, and breeding boxes H whose floors J are elevated from the floor E by metallic rims closely fitting the said floor, in the manner and for the purposes set forth.

In testimony of which invention I hereunto set my hand.

JOSIAH C. GRAY.

Witnesses:
JOHN N. MANN,
LEANDER McCLURG.